United States Patent [19]

Baumgartner et al.

[11] Patent Number: 4,725,379

[45] Date of Patent: Feb. 16, 1988

[54] PROCESS AND APPARATUS FOR MAKING A SOLUTION OR DISPERSION OF A HYDROSOLUBLE POWDER

[75] Inventors: Pierre Baumgartner, Grenoble; Bernard Boute, Saint Brignais; Pierre Galtier, Vienne-Estressin, all of France

[73] Assignee: Institut Francais du Petrole, Rueil-Malmaison, France

[21] Appl. No.: 817,194

[22] Filed: Jan. 8, 1986

[30] Foreign Application Priority Data

Jan. 8, 1985 [FR] France .................... 85 00287

[51] Int. Cl.[4] ............................. C08J 3/06
[52] U.S. Cl. ............. 252/314; 252/8.554; 523/300; 523/319; 523/330; 524/555; 524/916
[58] Field of Search ............ 523/300, 319, 330; 524/555; 252/8.554, 314

[56] References Cited

U.S. PATENT DOCUMENTS

| | | | |
|---|---|---|---|
| 2,573,949 | 12/1946 | Blizzard | 523/330 |
| 2,620,172 | 12/1952 | Jenett | 523/300 |
| 4,482,386 | 11/1984 | Wittwer | 523/330 |

FOREIGN PATENT DOCUMENTS

84/00967  3/1984  PCT Int'l Appl. .......... 324/555

Primary Examiner—C. Warren Ivy
Attorney, Agent, or Firm—Millen & White

[57] ABSTRACT

The invention concerns a process and an apparatus for making a stable solution or dispersion of a hydrosoluble powder.

It is characterized by the simultaneous use of a system for withdrawing powder from a vessel (2) e.g. by means of a gas (4), the dilution of the powder in a carrying gas, the driving with said carrying gas, of the obtained dilution, through a transfer duct (10), the passage of the dilution across an electrostatic field (11) and the solubilization in water of a tank (12).

The invention is particularly applicable to the dispersion of polyacrylamides used in the technique of enhanced oil recovery.

10 Claims, 2 Drawing Figures

PROCESS AND APPARATUS FOR MAKING A SOLUTION OR DISPERSION OF A HYDROSOLUBLE POWDER

This invention concerns a process and an apparatus for making a stable solution or dispersion of a powder, for example of hydrosoluble polymers.

Such stable solutions or dispersions are of high interest for improving the enhanced oil recovery, but they may also be used in other applications, particularly in the paper industry, water treatments and drilling (drilling muds), i.e. all the applications where hydrosoluble polymers are used as thickening flocculating agent.

The hydrosoluble polymers are sold on the trade as powders, but must be used, in these applications, as aqueous solutions. Thus, as far as enhanced oil recovery is concerned, in view of the worldwide energy crisis, it is now essential to recover a maximum amount of oil contained in the fields.

BACKGROUND OF THE INVENTION

One of the most usual enhanced oil recovery methods consists of scavenging the oil field by injection of injection of salty water, thus forcing the oil to sweat and flow out from the rock where it is adsorbed.

The efficiency of such a method is very often limited by the viscosity difference between oil and water, this difference being responsible for the tendency of water, instead of spreading itself over the whole area of the field, to find preferential paths, directly from the injection well to the production well.

In order to compensate for this viscosity difference, it is usual to thicken the injected water by addition of hydrosoluble polymers, very often an acrylamide or a polysaccharide polymer or copolymer.

For this purpose the polymeric material must be dissolved in water. Now, this dissolution is often difficult to achieve in view of the low solubilization rate and of the difficulty to subsequently disperse the solid in water.

On the other hand, accumulations of dispersed grains are immediately sealed in contact with water and form gelatinous conglomerates (micelles-microgels). A strong and extensive stirring provides for the dissolution of a substantial amount of said aggregates but it is practically impossible to stir over a very long period with a sufficient power.

In addition, the storage and handling on the field of these polymers rise many practical problems.

As a matter of fact, the polymer powders have the property to absorb the air moistness. This absorption results thereafter in a swelling and in the formation of conglomerates and/or microgels.

The conglomerates tend to stick to the walls and thus to block the operation of the mixing equipment, particularly the feed screw.

The microgels are not substantially dissolved in water and, once injected in the fields, they tend to generate clogging phenomena by blocking the outlet pore openings of the oil rocks.

On the other hand, the polymer powder, spreading on the earth and in air, rises security problems, making the ground thick and slippery and the atmosphere difficultly breathable.

In order to cope with these various disadvantages, different techniques for dispersing solid particles in an aqueous medium have been proposed in the prior art.

Thus it has been proposed in the prior art, for enhanced oil recovery, to use polymers aqueous emulsions directly prepared during the synthesis of the polymer, as taught, for example, in U.S. Pat. Nos. 3,637,564, 3,734,873 and 3,763,071. The water addition required in this technique is however unfavorable both for the transportation of the product and the storage thereof on the field.

Different techniques for dispersing these particles of hydrosoluble polymers in a liquid which would be nonsolvent for the polymer have already been proposed in the prior art. Thus, it has been taught to admix polyacrylamide with glycerine (e.g. in U.S. Pat. No. 3,839,202), with polyethylene glycol (e.g. in U.S. Pat. No. 3,402,137 or British Pat. No. 1,387,367), with ethylene glycol in the presence of an emulsifying agent (e.g. in U.S. Pat. No. 3,657,182) or still with an organic liquid not miscible with water, to which water is added so as to swell the polymer (e.g. in U.S. Pat. No. 3,282,874).

However the main difficulty encountered during the preparation of the polymers suspensions, according to said latter techniques, consists in the instability of the suspensions during their storage, due to their settling or their thickening as the result of a progressive swelling of the polymer in the presence of one of the ingredients; this instability during time results in the formation of compositions which are no longer uniform and which may become more or less compact. Their use is accordingly more difficult and risky.

Hydrosoluble polymers compositions and more particularly compositions of ethylene oxides polymers, which quickly dissolve in water, have been disclosed, for example, in the European patent application No. 0 002 368. When fluid compositions are obtained by dispersing the hydrosoluble polymer in an organic liquid insoluble in water, in the presence of a non-ionic emulsifying agent, a settling of the compositions is observed during their storage at ordinary temperature. It is for this reason that it has also been proposed to add to the compositions a thickening agent such as finely dispersed silica, asbestos or even soaps such as aluminum stearate. However, said compositions are not suitable for the subsequent preparation of polymers aqueous solutions destined to enhanced oil recovery techniques. As a matter of fact, it has been observed that the thickening agents proposed in the prior art produce secondary reactions, either of cross-linking or of degradation, in the presence of hydrosoluble polymers of the type used for enhanced oil recovery, and more particularly of acrylamide polymers or copolymers. These secondary reactions result in the formation of microgels which plug the porous media where they produce a viscosity decrease of the aqueous solutions and, accordingly, a loss in efficiency for the oil recovery.

Another technique, disclosed in the French Pat. No. 2,486,950 consists of producing relatively stable anhydrous suspensions in an aliphatic or aromatic liquid non solvent of the considered hydrosoluble polymers which are kept uniform and fluid during the storage and are quickly redissolved when dispersed in aqueous phase, finally giving diluted aqueous solutions suitable for enhanced oil recovery. However the use of said technninique is not sufficiently satisfactory.

SUMMARY OF THE INVENTION

The object of this invention is to provide a method or process and the corresponding apparatus for making a solution or dispersion of hydrosoluble powders (natural or synthetic) in water.

This process or method may be applicable to any product of fine granulometry and high hydrophilic property. In said method or process, the conveying fluid is a gas, such for example as air or an inert gas. The powder suspension is obtained by using hydrodynamic driving with air or nitrogen or carbon dioxide or any other propelling agent inert with respect to the conveyed product.

This well known propulsion, by pneumatic effect, has been the object of many patents, with application to the conveyance of various pulverulent products such as fecula, flour, grains (wheat), surgery, iron materials and in various fields, such for example as cement manufacturing, production and transformation of plastic materials, food industry, paper making, printing, tobacco industry etc. . . This type of propulsion is applicable to materials in bulk, shaped as grains or powders and to fibrous products.

However, for the uses contemplated in this invention, this pneumatic conveyance must be performed through special devices adapted to obtain very low flow rates of the conveyed solids (from a few kg/h to a few tens of kg/h and more precisely from 0.6 to 100 kg/h, preferably from 2 to 50 kg/h) at very low concentrations in the carrying gas (typically from 0.1 to 1 kg/m³ and more particularly from 0.1 to 0.3 kg/m³).

As a matter of fact, it is essential, in this invention, to obtain a very good dispersion of the solid particles in the conveying gas at regular and steady flow rates without shocks or swabbing or segregation phenomena, without deposits in the conveying duct and without saltation phenomena. An essential condition of the present invention is the achievement of a very good previous dispersion of the powdery solids in the conveying gas so as to subsequently favor the dispersion and the dilution of said powder in the aqueous medium to which it has to be admixed.

BRIEF DESCRIPTION OF THE DRAWINGS

Two possible non-limitiative embodiments of the invention are illustrated in FIGS. 1 and 2 of the accompanying drawings, to which the following description makes reference.

In order to further improve the dispersion of the pneumatically conveyed particles, the gas flow is caused to pass through an electrostatic device. After passage in an electric field of 10 to 40 kV and preferably 30 to 40 kV, all the individual particles carry electrostatic charges of the same sign. The presence of said charges makes the particles to repel each other and the conglomerates, if any, to dissociate.

Figure 1:
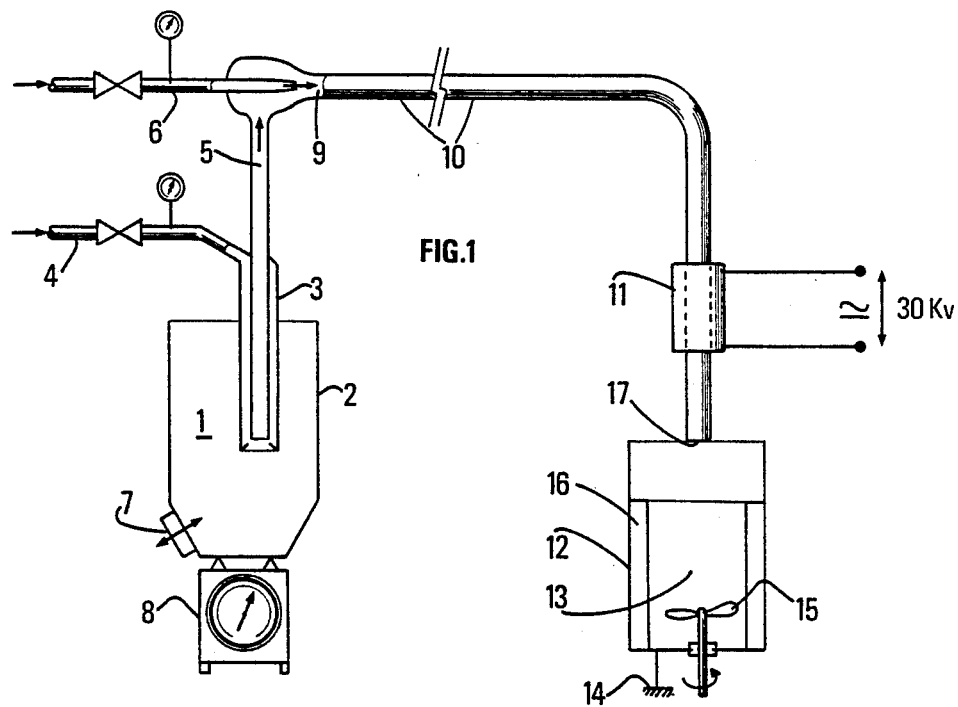

At the output of the electrostatic field, the gas flow is directed, through an insulating pipe or tube, to a dilution tank. The liquid (water) used for the dilution is stirred by means, for example, of a helix or an anchor or any equivalent device, preferably driven from the tank bottom (system of the Vortex type) so that the mechanical parts be preferably completely immersed; deposits on the one or more shafts of the stirrer are thus avoided.

When the stirring is of the Vortex type, the stirring speed is so adjusted as to obtain a Vortex developing a Reynolds number ranging from 1,000 to 10,000, preferably from 1,000 to 3,000 and, for example, of about 2,000, so as to provide for a quick renewing of the liquid surface.

The value of the Reynolds number is given by the formula:

$$N_{Re} = \frac{\rho n D^2}{\eta}$$

$\rho$ = liquid/density (kg/m³)
$\rho$ = dynamic viscosity in Pascal-second (1 Pascal-second = 10 poises)
D = diameter of the stirrer (meters)
n = rotating speed of the stirrer in number of turns per second.

The Reynolds number determines the flow conditions corresponding to the fluid stirring speed.

For $N_{Re} > 2,000$, the flow is considered as eddy; the present invention has precisely the advantage of a $N_{Re}$ value of about 2,000.

In particular, the method according to the invention is advantageously applied to the dispersion of hydrosoluble polymers (natural or synthetic) and more particularly to the preparation of polyacrylamides or polysaccharides solutions, used mainly for enhanced oil recovery. This mode of introduction makes dissolution in water very easy and further provides for a very quick dissolution of the polymers in water.

The total duration of the injection and maturation is generally from fifteen to thirty minutes, for example.

The quality of the solution, i.e. its excellent homogeneity and absence of aggregates or of microgels, may be ascertained from viscosity measurements versus time (these measurements are performed, for example, by means of a viscosimeter of the type with coaxial cylinders).

The invention contemplates the manufacture of solutions at concentrations varying from 100 ppm to 5–10% by weight and more particularly from 100 to 10,000 ppm when the process is used for enhanced oil recovery.

EXAMPLES

The following examples illustrate the invention.

By the used techniques it is possible, in particular, to obtain very viscous solutions, for example of about 1,000 cP (1,000 mPa.s) for a solution at 5,000 ppm, which, surprisingly, remain filterable. The filterability tests, at constant pressure (0.1 bar) with solutions at 1,000 ppm, effected with millipore membranes of 8 μm openings and 47 mm diameter, do not show any increase of differential pressure about these membranes during time. Hence no clogging phenomenon, as usually produced by aggregates or microgels, occurs. This filterability property thus makes the viscous solutions prepared according to the invention particularly adapted for use in enhanced oil recovery where they are injected in the porous medium formed by the field reservoir rock.

The invention thus concerns a process for obtaining a stable solution or dispersion of a hydrosoluble powder (pulverulent solid) and more particularly a powder of hydrosoluble polymers.

It is characterized in that:
(a) the powder to be treated, placed in an enclosure, is discharged therefrom at a rate from 0.6 kg/h to 100 kg/h and preferably from 2 kg/h to 50 kg/h, either by ejection by means of a gas, preferably anhydrous, for example an inert gas or air (FIG. 1) or by mechanical driving (FIG. 2), (b) the solid thus discharged outside from said enclosure, in an elongate zone of tubular shape, is admixed with a carrying gas or conveying fluid whose feed rate to the elongate zone is so adjusted that the concentration of powder or pulverulent solid in the carrying fluid be in the range from 0.1 to 1 kg/m$^3$ and preferably from 0.1 to 0.3 kg/m$^3$, (c) the mixture powder-carrying gas or gas flow passes across the whole zone of elongate shape, (d) said gas-flow then circulates, preferably downwardly, through a zone subjected to an electrostatic field whose voltage (or potential) ranges from 10 kV to 40 kV and preferably from 20 kV to 35 kV, with respect to the earth, (e) said gas-flow is then introduced in a zone of dilution with water, said zone being subjected to stirring, preferably of the Vortex type, said stirring being so adjusted as to develop a Reynolds number ranging from 1,000 to 10,000, preferably from 1,000 to 3,000 and, more particularly, of about 2,000, so as to provide for a quick renewing of the liquid surface.

Figure 2:
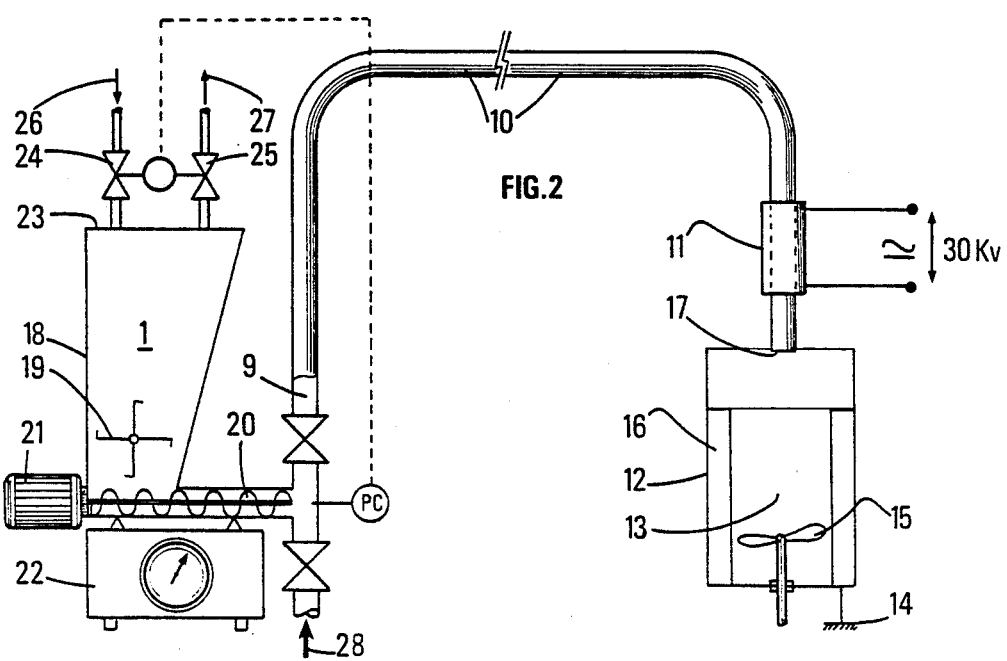

The two FIGS. 1 and 2 of the accompanying drawings illustrate two possible preferred embodiments of the invention relating to a pneumatic conveying system providing for low flow rates of the conveyed solids, with very small concentrations in the conveying gas, with regular and steady flow rates and with a good dispersion of the particles in the gas flow.

The apparatus shown in FIG. 1 comprises:
a tank (2) containing a powdery solid (1)
a sucker (3) (or device for sucking-up solid) plunging into the solid mass (1) and which is fed with gas from duct(4), said gas generating a over-pressure in tube (5) of the sucker, said over-pressure producing the sucking-up of powder into said tube (5),
an elongate tube (10) (made of an electrically insulating material) connected to tube (5) and wherein, at the vicinity of the sucker (3), opens a tube (6) for injecting a carrying gas adapted to carry the powder therewith into the elongate tube (10),
an electrostatic field (11) fed with an electrostatic generator, the potential or voltage of this field ranging from 10 kV to 40 kV (preferably from 20 to 35 kV) with respect to the earth,
a metal tank (12) placed below the electrostatic field, said tank being filled with water (13), electrically connected to earth (14) and provided with a stirring system (15).

Thus, in FIG. (1), the powdery solid (1), conditioned in an enclosure or tank, which here may be a vessel, a barrel or even a bag (2), is directly sucked by means of a sucker (3) of adjustable sucking power, with a minimum amount of carrying gas (4) just necessary to suck small amounts of solids. The gas injected in (4) produces an over-pressure in tube (5), thus driving through tube (10) the solid particles thus ejected from zone (2). When the solid to be conveyed is very hydrophilic, the conveying gas (4), in view of the small flow rates required for driving along the solid, may advantageously consist of completely dehydrated air or inert gas, thus not affecting the conditioning of the powdery material.

The so-achieved suspension (5) is then diluted and brought to the desired concentration and then conveyed towards an electrostatic field, by injection of a carrying gas, or conveying fluid, consisting of air and/or additional gas, directly at the output of the sucker (3). The air or additional gases injected at this level in tube (6) need not to be dehydrated since they are only in contact with already suspended powder.

The selection of the gas feed through line (6) makes possible to act on the solids suction by generating a more or less intense depression in tube (10), thereby regulating the flow of solids towards zone (12).

In order to achieve the regular and steady driving of the pulverulent solid, it is preferable not to modify, during operation, the position of the sucker (3), initially deeply plunged into the product.

In the embodiment of FIG. (1), tubes (5) and (10) have been so selected as to form therebetween a substantially right angle.

The regular feeding with solids (1) at the bottom of the sucker (3) is advantageously achieved by a device generating vibrations (7), pneumatic or not, at the level of vessel (2) containing the powdery solid (1). The weight of material so engaged in pneumatic conveyance is periodically controlled, up to the injection of the desired amount of powder, by means of the balance (8), automatic or not, on which lies the vessel(2).

The so-obtained suspension (9) is conveyed, very diluted, in the pneumatic conveying duct (10), made of an electrically insulating material (e.g. PVC). Then it passes through a metal section (11) brought to a high voltage (from 10 to 40 kV) by an external generator. The electrostatically charged particles repel each other and are precipitated in the metallic dilution tank (12), filled with water (13) and electrically connected to earth. The stirring system of said dilution tank comprises a stirrer, for example of the helix or anchor type (15), preferably actuated from the bottom of the tank, in order to avoid any deposit on the emerged mechanical parts; the tank (12) also preferably comprises counter-baffles (16)(or counter-deflectors) of a size defined according to the art for producing an adequate mixture, preferably intimate.

The rotating speed of the stirrer is so adjusted as to produce a quick renewing of the liquid surface facing the opening of the pneumatic conveying duct, wherefrom the electrified particles of the diluted suspension are precipitated.

The assembly of this device constitutes a simple apparatus, easy to adjust and to use in the working conditions on a worksite. The same holds true in respect of the second device hereinafter described with reference to FIG. (2).

The apparatus of FIG. (2) comprises:
(a) a feed hopper (18) containing the powder or powdery solid (1) to be treated, said hopper further comprising the following devices:
means for introducing powder in the hopper,
at least one endless screw system (20) or any equivalent system arranged at the lower part of the hopper and actuated by a motor (21) of variable speed, the endless screw system (20) providing for the discharge of the powder out of the hopper (18),
(b) a pneumatic conveying duct (10), made of electrically insulating material, provided with a system for introducing a flow of carrying gas (arrow 28), this carrying gas being used to drive the powder therewith all along duct (10),
(c) an electrostatic field (11) fed by a generator,
(d) a metallic tank (12) placed below the electrostatic field, said tank being filled with water (13), electrically connected to earth (14), and provided with a stirring system (15), More precisely, in FIG. 2, the powdery solid (1) of barrel (2) is here poured into the feed hopper (18) of a feed regulator of the screw type. In order to favor the lowering of the solid, this hopper is preferably asymmetric (i.e. it has for example at least one oblique wall and at least one vertical wall). It is advantageously equipped with a stirrer of the vault-breaker type (19) or a similar system. The powdery solid (1) is extracted from said hopper (18) by means of an endless screw, spiral or Archimedes screw system (20) mechanically driven by a motor of variable speed (21). For sticky products, a double twin-screw system will be advantageously used to provide for a regular and steady flow of the product. By the judicious selection of the nature and geometry of the screw extraction system, in accordance with the characteristics of the powdery solid, it is possible to adjust the rotating speed of motor (21) to obtain as low as possible flow-rates of extracted solid, such for example as 0.6 kg/h. The amount of the soextracted solids may be periodically controlled, up to the total amount, for example by means of a balance (22), automatic or not, which may be used in turn to control the rotating speed of motor (21). The screw (20) here acts as solid distributor to duct (10).

When the solid products are particularly hygroscopic, it is possible, just after the loading of the hopper (18), to purge said solids from their interstitial gas by means of a countercurrent scavenging with anhydrous gas, through the screw system (20). When products particularly sensitive to ambient moistness are concerned, it is possible to unload them through the screw system (20) under perfectly anhydrous atmosphere, by hermetically sealing the hopper with a cover (23). Optionally, the closing and opening of valves (24) and (25), for the feed (26) and exhaust (27) of perfectly anhydrous auxiliary gas, is performed through a servomechanism (PC) so as to balance the pressures between the output of the screw system (20) and the top of the hopper (18).

The powdery solids extracted through the screw system (20) are poured into a pneumatic conveying tube or duct (10) made of electrically insulating material, and scavenged with a carrying gas (arrow 28) necessary to obtain the desired high rate of dilution. It is unnecessary that this carrying gas (arrow 28) be previously dehydrated since its flow rate is such, with respect to the amount of driven solid, that the dispersion of said particles in the large amount of carrying gas is easily achieved. The cross-sectional area of the pneumatic conveying duct (10) is so selected as to impart a high circulating velocity (minimum of 10 m/s) to the diluted suspension (9). It must be observed that these values are also applicable in the conveying duct (10) of FIG. 1.

The wide dispersion of solid particles of suspension (9) is improved by the electrostatic dispersing system (11) of the same type as that shown in FIG. (1). This wide dispersion of suspension (9) during the pneumatic conveyance is essential to the obtainment of a good dilution of the powder in water (13) of tank (12).

The remainder of the device used for making this dilution is in any respect similar to that described with reference to FIG. (1) (same reference number for the same part of apparatus).

EXAMPLE 1-A (comparative)

In this example, the apparatus of FIG. 1 is used, but without electrostatic field.

800 liters of water at 20° C. are contained in a circular tank of 1000 liters, stirred by means of a three-stage helix rotating at 100 turns/minute, whose rotation axis is at the top of the tank and whose wall is provided with four counterblades. The solvent is strongly stirred. A torque meter, measuring the power developed by the stirrer, is mounted on the motor axis. A polyacrylamide (product sold as "Pusher P 700" by the Dow Chemical Company, of particle size ranging from 50 to 250 $\mu$m) is progressively added by means of a pneumatic sucker. The powder to be treated is discharged at a rate of 25 kg/h. The powder concentration in the carrying fluid (air) is 0.2 kg/m$^3$, the water flow rate in the sucker being 1 m$^3$/hour. The obtained mixture remains stable and fluid during several weeks. A sample of said solution is taken for following the variation, during time, of the viscosity, by means of a viscosimeter of the coaxial cylinders type (1500.10$^{-3}$ Pa.s. for the solution, i.e. 1500 centipoises). The dissolution of the polymer is completed after less than 15 minutes, the viscosity is at the maximum value at the end of the same period.

The power supplied during this experience was 45 W; Reynolds number=1500−2000.

The obtained viscous solution remains filterable. However, the filterability tests, at constant flow rates, with solutions at 1,000 ppm, effected with millipore membranes having openings of 8 $\mu$m and a diameter of 47 mm, show an increase in the differential pressure about said membranes, during time. Various clogging phenomena are observed, particularly in filters during the filtration test.

EXAMPLE 1

Example 1-A is repeated but with the addition of an electrostatic spray gun fed with an electrostatic generator of 30 kV. The polymer is dissolved in about the same time but no polymer deposit is observed on the immersed parts. The electrified particles are more quickly oriented on the stirred liquid surface.

The supplied power during said experiment is 45 Watts for a measured viscosity of 1500 10$^{-3}$ Pa.s (1500 centipoises). (Reynolds number: 1,500−2,000). Here, the obtained solutions do not produce any clogging in the filters during the filtration test, thus showing the complete absence of clots or microgels, and hence the obtainment of a very homogeneous solution.

EXAMPLE 2-A (comparative)

Example 1-A is repeated but, instead of introducing the polymer by means of a pneumatic sucker, the latter is added by means of the device shown in FIG. 2 (however without using an electrostatic field) i.e. by means of a feed screw. 50 grams of product are introduced simultaneously, the other operating conditions being those of example 1-A. On the one hand, it is observed that a stirring time of about 2 hours is necessary to obtain a stable viscosity and, on the other hand, that the solution exhibits apparent heterogeneities in the transparent medium with clogging of the filter during the filtration test.

EXAMPLE 2

Example 2-A is repeated but with the use of an electrostatic field device, as in example 1. The other operating conditions are those of example 1. Substantially the same results are obtained and the resultant solutions are successfully subjected to the filterability test.

EXAMPLE 3

The device of example 1 has been used to prepare 800 liters of a 3.5% by weight solution of a polysaccharide: zanthane gum of molecular weight $3.10^6$.

The polymer has been introduced by means of the apparatus described with reference to FIG. 1 and under the conditions of example 1.

The viscosity measurements during time show that the solution is stabilized after 15 minutes.

The viscosity at 20° C. is $7000.10^{-3}$ Pa.s.

What is claimed as the invention is:

1. A process for making a stable dispersion or solution of hydrosoluble powder the process comprising the steps of:
   (a) placing the powder in an enclosure in dry form and withdrawing the powder therefrom at a rate of 0.6 kg/h to 100 kg/h by entraining the powder in a gas; conveying the entrained powder through an elongate tube in which tube a stream of conveying gas is fed at a feed rate adjusted so that the concentration of powder in the stream of conveying gas is in the range of 0.1 kg/m$^3$ to 1.0 kg/m$^3$;
   (b) passing the stream of conveying gas with the powder therein through an electrostatic field having a voltage in the range of 10 KV to 40 KV with respect to ground, and
   (c) dispersing the powder entrained in the stream of conveying gas in a quantity of water retained in a container by impinging the stream on the surface of the water and stirring the water so as to develop a Reynolds number in the range of 1,000 to 10,000 to provide a rapid renewing of a liquid surface on the water in the container.

2. The process of claim 1 wherein the powder is withdrawn from the enclosure by creating a partial vacuum in a tube above the enclosure to pull the powder from the enclosure into the tube.

3. The process of claim 2 wherein the enclosure is vibrated to help dislodge the powder therefrom.

4. The process of claim 1 wherein the stream of conveying gas is passed through the electrostatic field while flowing downwardly toward the surface of the water.

5. The process of claim 1 wherein the powder is withdrawn by mechanically advancing the powder from the enclosure to a location where the gas entrains the powder.

6. The process of claim 1 wherein the powder is discharged from the enclosure at a rate in the range of 2 kg/hr to 50 kg/hr; the concentration of powder in the stream of conveying gas is in the range of 0.1 kg/m$^3$ to 0.3 kg/m$^3$ and the Reynolds number is in the range of 1,000 to 3,000.

7. The process of claim 1 wherein the hydrosoluble polymer is a natural hydrosoluble polymer.

8. The process of claim 1 wherein the hydrosoluble polymer is a synthetic hydrosoluble polymer.

9. The process of claim 8 wherein the polymer is a polyacrylamide used to enhance oil recovery.

10. The process of claim 7 wherein the polymer is a polysaccharide used to enhance oil recovery.

* * * * *